Nov. 2, 1954  D. L. YEAGER  2,693,567
ELECTRIC TRANSLATING APPARATUS
Filed Feb. 7, 1952
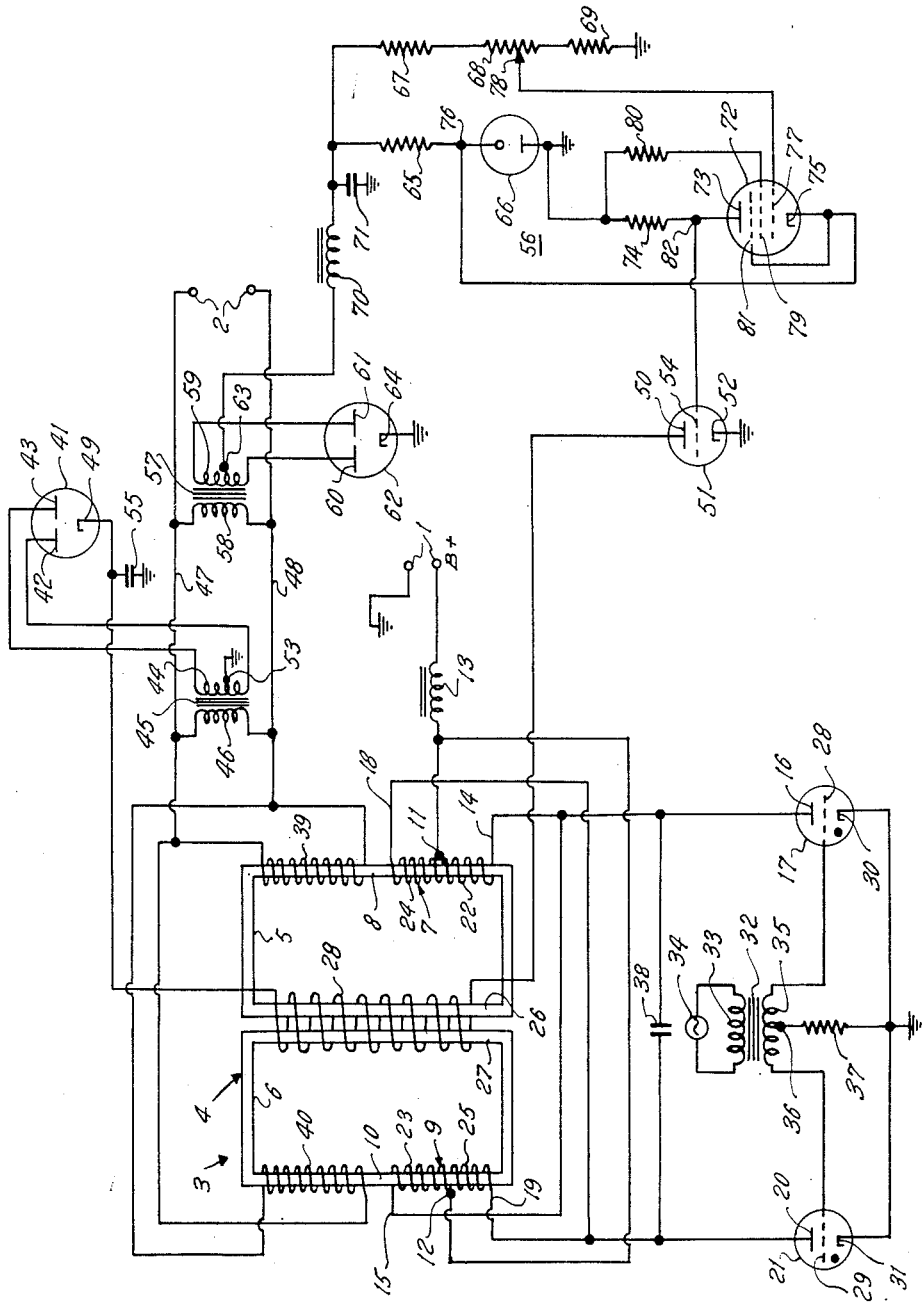
DAVIS L. YEAGER
INVENTOR.
BY Walter J. Jagmin
ATTORNEY 2,693,567

ELECTRIC TRANSLATING APPARATUS

Davis L. Yeager, Garland, Tex.

Application February 7, 1952, Serial No. 270,361

10 Claims. (Cl. 321—18)

This invention relates to electric translating apparatuses and more particularly to an electric translating apparatus for transmitting energy from a direct current supply circuit to an alternating current load circuit.

In many applications it is desirable to provide an electric translating apparatus for transmitting energy from a direct current supply circuit to an alternating current load circuit and to maintain the voltage of the load circuit substantially constant regardless of variations in the load or the voltage of the supply circuit. Moreover, the size and weight of the apparatus are of critical importance in many applications, e. g., in airborne equipment. Electric translating apparatuses of the parallel inverter type such as that disclosed in the patent to David Jean Smith, No. 2,575,600, which employ a saturable reactor connected across one of the windings of the output transformer achieve the desired result of maintaining the voltage of the alternating current circuit substantially constant regardless of variations in load or in the voltage of the supply circuit. In order to decrease the weight and size of such apparatuses, it is desirable to substitute a saturable transformer for the saturable reactor and the output transformer. It is desirable, of course, that this saturable transformer perform the functions of both the saturable reactor and the output transformer and that its structural and functional relationship with other components of the apparatus be such as not to affect adversely the operation of the electric translating apparatus.

Accordingly, it is an object of the invention to provide a new and improved electric translating apparatus for transmitting enery from a direct current supply circuit to an alternating current load circuit.

It is an other object of the invention to provide a new and improved electric translating apparatus for transmitting energy from a direct current supply circuit to an alternating current load circuit having a voltage regulating means for maintaining the voltage of the load circuit substantially constant.

It is still another object of the invention to provide a new and improved electric translating apparatus for transmitting energy from a direct current supply circuit to an alternating current load circuit having voltage regulating means including a saturable transformer for maintaining constant the voltage of the load circuit.

Briefly stated, in the illustrated embodiment of the invention a new and improved electric translating apparatus is provided which transmits energy from a direct current supply circuit to an alternating current load circuit. The apparatus includes a saturable transformer having a magnetic core structure providing two closed flux paths. A pair of primary windings disposed on the magnetic core structure are connected between the direct current circuit and a pair of electric discharge means which are rendered alternately conductive by an alternating potential impressed on their control grids. A capacitor is connected across the primary windings to commutate the current from one electric discharge means to the other. The primary windings induce fluxes in the closed flux paths which in turn induce an alternating current in secondary windings also disposed on the magnetic core structure. A control or saturating winding disposed on the magnetic core structure is variably energized by means of a control electric discharge means to vary the saturation of the flux paths to vary the amount of alternating fluxes in the flux paths in accordance with the alternating voltage across the secondary winding and thus maintains the alternating voltage of the load circuit substantially constant. The primary windings are so disposed on the magnetic core structure as to induce no alternating current in the saturating winding and to reactively connect the pair of electric discharge means so that the commutating capacitor may effectively commutate current from one of the electric discharge means to the other.

For a better understanding of the invention reference may be had to the following description taken in connection with the accompanying drawing and its scope will be pointed out in the appended claims. The single figure of the accompanying drawing illustrates diagrammatically a preferred embodiment of the invention for translating direct current into alternating current of constant voltage.

Referring now to the single figure of the drawing, the electric translating apparatus for transmitting energy from a direct current supply circuit 1 to an alternating current load circuit 2 includes a saturable transformer 3 having a magnetic core structure 4. The magnetic core structure, preferably made of laminated steel having good hysteresis characteristics, comprises two cores 5 and 6, although a single three legged core could be employed if it were so desired. Each of the cores 3 and 4 forms a closed flux path.

A primary winding 7 is wound about the leg 8 of the core 5 and a similar primary winding 9 is wound about the leg 10. The midpoints 11 and 12 of the primary windings 7 and 9, respectively, are connected to one side of the direct current supply circuit through the smoothing reactor 13. The lower terminal 14 of the primary winding 7 and the upper terminal 15 of the primary winding 9 are connected to the anode 16 of an electric discharge means 17 while the upper terminal 18 of the primary winding 7 and the lower terminal 19 of the primary winding 9 are connected to the anode 20 of an electric discharge means 21. It will be apparent, therefore, that when electric discharge means 17 is conductive, current flows through the lower portion 22 of the primary winding 7 and the upper portion 23 of the primary winding 9 and that when electric discharge 21 is conductive, current flows through the upper portion 24 of the primary winding 7 and the lower portion 25 of the primary winding 9. This manner of connection of the primary windings ensures that the alternating fluxes induced in the cores 8 and 10 by the current flowing through the primary windings when the electric discharge means 17 and 21 are rendered alternately conductive, in a manner to be described presently, at any one moment will flow in opposite directions in the legs 26 and 27 of the cores 8 and 10, respectively. As a result, no current will be induced in the saturating winding 28 wound about the legs 26 and 27 since the sum of the alternating fluxes in these legs will always be substantially zero.

The electric discharge means 17 and 20 are preferably of the gaseous discharge type and are provided with control grids 28 and 29 and cathodes 30 and 31, respectively. Alternating potentials are impressed on the control grids by means of a grid drive transformer 32 whose primary winding 33 is connected across any suitable source 34 of alternating current of a desired frequency. The secondary winding 35 of the grid drive transformer has its electrical midpoint 36 connected to the cathodes through a current limiting resistor 37 and its opposite ends to the control grids. A commutating capacitor 38 is connected between the anodes 16 and 20 of the electric discharge means.

A secondary winding 39 wound on the leg 8 of the core 5 and a secondary winding 40 wound on the leg 10 of the core 6 are connected in parallel to energize the alternating current load circuit 2 since the alternating fluxes induced in the cores 5 and 6 by the current flowing through the primary windings when the electric discharge means are rendered alternately conductive induce alternating potentials in the secondary windings.

The general principles of operation of the above described electric translating device will be well understood by those skilled in the art. In brief, if one of the electric discharge means, for example the electric discharge means 17, is rendered conductive by the potential impressed on its control grid 28, current will flow through the lower portion 22 of the primary winding 7 and through the upper portion of the primary winding 9 inducing a half cycle of alternating current in the secondary windings 39 and 40. During this interval the capacitor 38 becomes charged to substantially twice the potential of the direct current source or supply circuit 1, and, when the grid potential supplied by the secondary winding 35 reverses polarity to render the electric discharge means 21 conductive, the potential of the capacitor is effective to commutate the current from the electric discharge means 17 to the electric discharge means 21 since the side of the capacitor 38 not directly connected to the anode 16 of the electric discharge means 17 is connected to the anode 16 through the primary winding 9. Current now flows through the upper portion 24 of the primary winding 7 and the lower portion 25 of the primary winding 9 inducing a half cycle of alternating current of opposite polarity in the secondary windings 39 and 40 of the saturable transformer. If the electric discharge means 17 is again rendered conductive by a reversal of the polarity of the potential impressed on the control grid 17, the potential of the capacitor 38, which again became charged to substantially twice the potential of the direct current supply circuit, is effective to commutate the current from the electric discharge means 21 to the electric discharge means 17 since the side of the capacitor 38 not directly connected to the anode 20 of the electric discharge means 21 is connected to the anode 20 through the primary winding 7. In this manner, the current is successively commutated between the electric discharge means 17 and 21 as they are alternately and periodically rendered conductive by the alternating potential impressed on their control grids 28 and 29, respectively, and an alternating current is induced in the secondary winding 39 and 40 which energizes the alternating current load circuit.

The employment of the primary windings in the manner described results not only in the prevention of the inducement of alternating current in the saturating winding and the reactive coupling of the anodes of the electric discharge means to allow commutation of current from one to the other, but also is the most efficient use of the iron in the cores 8 and 10 since each core is employed during the periods of conduction of both electric discharge means.

The saturating winding 28 may be energized with direct current from any suitable source of direct current. In the illustrated embodiment of the invention, direct current is supplied to the saturating winding by a fullwave rectifier 41 whose anodes 42 and 43 are connected to the opposite sides of the primary winding 44 of a transformer 45 having a primary winding 46 connected across the leads 47 and 48 to the load circuit 2. The cathode 49 of the rectifier is connected to one side of the saturating winding. The opposite side of the saturating winding is connected to the anode 50 of a control electric discharge means 51 of the high vacuum type whose cathode 52 is connected through ground to the electrical midpoint 53 of the secondary winding 44. The amount of current flowing through the saturating winding 28 may be varied by varying the potential impressed on the control grid 54 of the control electron discharge means. A capacitor 54 is connected to the cathode 49 and the electric midpoint 53 of the secondary winding 44 to smooth out the direct current transmitted to the saturating winding.

Variations in the current flowing through the saturating winding vary the saturation of the cores 8 and 10 and this varies the amount of alternating magnetic flux which is induced in the cores 8 and 10 by the primary windings 7 and 9 respectively. If the amount of current in the saturating winding 28 is increased, the amount of alternating magnetic flux in the cores 8 and 10 is decreased and conversely, if the amount of current in the saturating winding is decreased, the amount of alternating flux in the cores 8 and 10 is increased. Since the alternating voltages induced in the secondary windings 39 and 40 are directly proportional to the amounts of alternating fluxes in the cores 8 and 10, the output voltage of the saturable transformer, and therefore of the load circuit 2, can be regulated by varying the amount of direct current flowing in the saturating winding.

The amount of current in the saturating winding is varied in accordance with the voltage of the load circuit by means of a control circuit 56 which impresses a potential on the control grid 54 which varies in accordance with the voltage of the load circuit. The control circuit comprises a voltage sensing transformer 57 having a primary winding 58 connected across the terminals 47 and 48 of the load circuit and a secondary winding 59 whose opposite sides are connected to the anodes 60 and 61 of a full wave rectifier 62. The electrical midpoint 63 of the secondary winding is connected to the cathode 64 of the rectifier through two voltage divider bridges, one of the bridges comprising a resistance 65 and a glow discharge means 66 which acts as a voltage regulator and the other comprises three resistances 67, 68 and 69 connected in series. A conventional filter including an inductive reactor 70 and a capacitor 71 are connected between the voltage divider bridges and the rectifier to smooth out the direct current transmitted to the bridges.

An electric discharge means 72 of the high vacuum type is provided with an anode 73, which is connected through a resistance 74 to the cathode 64 of the rectifier and a cathode 75 which is connected to the common connection or junctions 76 of the glow discharge means 66 and the resistance 65. Since the cathode is connected to the common connection 76, the potential of the cathode is maintained constant due to the voltage regulating effect of the glow discharge means regardless of the variations in the voltage of the load circuit. The control grid 77 of the electric discharge means 72 is connected to the resistance 68 by an adjustable contact 78 and, therefore, has impressed upon it a potential which varies in accordance with the voltage of the load circuit. The screen grid 79 is connected through the resistance 80 to cathode 64 of the amplifier and the shield 81 is connected to the cathode 75. The control grid 54 of the control electric discharge means 51 is connected to the common connection 82 of the anode 73 and the resistance 74.

It will be apparent now that when the voltage of the load circuit 2 increases, the potential impressed on control grid 77 of the electric discharge means 72 becomes more negative since the voltage across the voltage divider bridge comprising the resistances 67, 68 and 69 varies in accordance with the voltage across the output circuit. The electric discharge means 72 becomes less conductive and, as a result, a less negative potential is impressed on the control grid 54 of the control electric discharge means 51. The control electric discharge means conducts a larger current and more current flows through the saturating winding 28 decreasing the amount of alternating fluxes in the cores 8 and 10 and 20, therefore, decreasing the voltage induced in the secondary windings 39 and 40, and consequently, the voltage of the load circuit 2. Conversely, if the voltage of the load circuit decreases, a less negative potential is impressed on the control grid 77 of the electric discharge means 72 which is thereby rendered more conductive. This causes a more negative potential to be impressed on the control grid 54 which becomes less conductive and less current now flows in the saturating winding 28. The amount of alternating fluxes in the cores 8 and 10 is increased and the alternating voltage induced in the secondary winding 39 and 40, and consequently the voltage of load circuit 2, is increased. In this manner the voltage of the alternating current load circuit is maintained constant.

It will be seen now that a new and improved electric translating apparatus has been provided which has a voltage regulating circuit which includes a saturable transformer 3 having a magnetic core structure 4 providing a pair of closed flux paths. It will also be seen that a direct current saturating winding 28 is disposed on the magnetic core structure to saturate the two flux paths in accordance with the voltage of the alternating current load circuit 2 in order that the amount of alternating fluxes in the two flux paths induced by a pair of primary windings 7 and 9 may also be varied to vary the voltage induced in a pair of secondary windings 39 and 40 by the alternating fluxes to maintain constant the voltage of the load circuit 2 which is energized by the secondary windings. It will also be apparent that the primary windings are so connected that the two cores 8 and 10 providing the two flux paths are utilized more efficiently and that the anodes 16 and 20 of the electric discharge means 17 and 21 are reactively coupled so that the commutating capacitor 38 may effectively commutate the current from one electric discharge means to the other.

It will be apparent that various changes and modifications in the illustrated embodiment of this invention may be made without departing from the invention. For example, each of the center tapped primary windings could be replaced by a pair of individual windings having one pair of ends connected together and the term "primary winding" as used in this specification is understood to cover a pair of individual windings so connected, the common connection of the pair of ends being covered by the term "electric midpoint." It is intended, therefore, in the appended claims to cover all such changes and modifications as fall within the true spirit and scope of the invention.

What I claim as new and desire to secure by Letters Patent of the United States is:

1. An electric translating apparatus for transmitting energy from a direct current supply circuit to an alternating current load circuit comprising, a saturable transformer having a magnetic core structure providing a pair of closed flux paths; primary windings operatively associated with said closed flux paths for inducing alternating fluxes in said flux paths, said primary windings being connected across said direct current supply circuit through a pair of electric discharge means; means for rendering said electric discharge means alternately conductive; a commutating capacitance connected between said electric discharge means; a secondary winding disposed on each of said flux paths and connected to said load circuit for energizing said load circuit; a saturating winding operatively associated with said flux paths for saturating said flux paths; means for variably energizing said saturating windings with direct current; and means responsive to the voltage of said load circuit and operatively associated with said last mentioned means for varying the energization of said saturating winding in accordance with the voltage of said load circuit.

2. An electric translating apparatus for transmitting energy from a direct current supply circuit to an alternating current load circuit comprising, a saturable transformer having a magnetic core structure providing a pair of closed flux paths; a pair of primary windings operatively associated with said closed flux paths for inducing alternating fluxes in said flux paths; a pair of electric discharge means, each of said electric discharge means having an anode, a cathode and a control member, each of said primary windings having its electrical midpoint connected to one side of said supply circuit and its end terminals to said anodes, said cathodes being connected to the other side of said supply circuit, a commutating capacitance connected between said anodes; means for impressing potentials on said control members of said electric discharge means for rendering said electric discharge means alternately conductive, current flowing through one portion of each primary winding when one of said electric discharge means is conductive and through another portion of each primary winding when the other of said electric discharge means is conductive; a secondary winding on each of said flux paths connected to said load circuit for energizing said load circuit; a saturating winding operatively associated with said flux paths for saturating said flux paths; means for variably energizing said saturating winding with direct current; and means responsive to the voltage of said load circuit and operatively associated with said last mentioned means for varying the energization of said saturating winding in accordance with the voltage of said load circuit.

3. An electric translating apparatus for transmitting energy from a direct current supply circuit to an alternating current load circuit comprising, a saturable transformer having a magnetic core structure providing a pair of closed flux paths; a pair of primary windings operatively associated with said closed flux paths for inducing alternating fluxes in said flux paths; a pair of electric discharge means having an anode, a cathode and a control member, each of said primary windings having its electrical midpoint connected to one side of said supply circuit and its end terminals to said anodes, said cathodes being connected to the other side of said supply circuit; a commutating capacitance connected between said anodes; means for impressing potentials on said control members for rendering said discharge means alternately conductive, current flowing through one portion of each primary winding when one of said electric discharge means is conductive and through another portion of each primary winding when the other of said electric discharge means is conductive; a secondary winding on each of said flux paths, said secondary windings being connected to said load circuit for energizing said load circuit; a saturating winding operatively associated with said flux paths for saturating said flux paths; a control electric discharge means connecting said saturating across a source of direct current, said control electric discharge means having a control member; and means operatively associated with said load circuit for impressing a potential on said control member of said control electric discharge means which varies in accordance with the voltage of said load circuit.

4. An electric translating apparatus for transmitting energy from a direct current supply circuit to an alternating current load circuit comprising a saturable transformer having a magnetic core structure providing a pair of closed flux paths; primary windings operatively associated with said closed flux paths for inducing alternating fluxes in said flux paths, said primary windings being connected across said direct current supply circuit through a pair of electric discharge means; means for rendering said electric discharge means alternately conductive; said primary windings inducing a flux in one direction in each flux path when one of said electric discharge means is conductive and inducing a flux in the other direction in each flux path when the other of said electric discharge means is conductive; a commutating capacitance connected between said electric discharge means; a secondary winding disposed on each of said flux paths and connected to said load circuit for energizing said load circuit; a saturating winding operatively associated with said flux paths for saturating said flux paths; means for variably energizing said saturating winding with direct current; and means responsive to the voltage of said load circuit and operatively associated with said last mentioned means for varying the energization of said saturating winding in accordance with the voltage of said load circuit.

5. An electric translating apparatus for transmitting energy for a direct current supply circuit to an alternating current load circuit comprising a saturable transformer having a magnetic core structure providing a pair of closed flux paths; primary windings operatively associated with said closed flux paths for inducing alternating fluxes in said flux paths, said primary windings being connected across said direct current supply circuit through a pair of electric discharge means; means for rendering said electric discharge means alternately conductive, said primary windings inducing a flux in one direction in each flux path when one of said electric discharge means is conductive and inducing a flux in the other direction in each flux path when the other of said electric discharge means is conductive; a commutating capacitance connected between said electric discharge means; a secondary winding disposed on each of said flux paths and connected to said load circuit for energizing said load circuit; a saturating winding operatively associated with said flux paths for saturating said flux paths; means comprising a control electric discharge means connected to said saturating winding for variably energizing said saturating winding with direct current; and means responsive to the voltage of said load circuit for impressing a potential on said last mentioned control member which varies in accordance with the voltage of said load circuit.

6. An electric translating apparatus for transmitting energy from a direct current supply circuit to an alternating current load circuit comprising, a saturable transformer having a magnetic core structure, a pair of primary windings, a pair of secondary windings, said magnetic core structure magnetically linking one of said primary windings to one of said secondary windings and magnetically linking the other of said primary windings to the other of said secondary windings, and a saturating winding for varying the magnetic linkage between said primary and secondary windings, said secondary windings being connected to said load circuit; a pair of electric discharge means connecting said primary windings across said direct current supply circuit; means for rendering said electric discharge means alternately conductive; a commutating capacitance connected between said electric discharge means; means for variably energizing said saturating winding with direct current; and means responsive to the voltage of said load circuit and operatively associated with said last mentioned means for varying the energization of said saturating winding in accordance with the voltage of said load circuit.

7. An electric translating apparatus for transmitting energy from a direct current supply circuit to an alternating current load circuit comprising, a saturable transformer having a magnetic core structure, a pair of primary windings, a pair of secondary windings, said magnetic core structure magnetically linking one of said primary windings to one of said secondary windings and magnetically linking the other of said primary windings to the other of said secondary windings, and a saturating winding for varying the magnetic linkage between said primary winding and said secondary windings, said secondary windings being connected to said load circuit; a pair of electric discharge means, each of said electric discharge means having an anode, a cathode and a control member, each of said primary windings having its electrical midpoint connected to one side of said supply circuit and its end terminals to said anodes, said cathodes being connected to the other side of said supply circuit; a commutating capacitance connected between said anodes; means for impressing potentials on said control members of said electric discharge means for rendering said electric discharge means alternately conductive, current flowing through one portion of each primary winding when one of said electric discharge means is conductive and through another portion of each primary winding when the other of said electric discharge means is conductive; a means for variably energizing said saturating winding with direct current; and means responsive to the voltage of said load circuit and operatively associated with said last mentioned means for varying the energization of said saturating winding in accordance with the voltage of said load circuit.

8. An electric translating apparatus for transmitting energy from a direct current supply circuit to an alternating current load circuit comprising, a saturable transformer having a magnetic core structure, a pair of primary windings, a pair of secondary windings, said magnetic core structure magnetically linking one of said primary windings to one of said secondary windings and magnetically linking the other of said primary windings to the other of said secondary windings, and a saturating winding for varying the magnetic linkage between said primary and secondary windings, said secondary windings connected to said load circuit; a pair of electric discharge means, each of said primary windings having its electrical midpoint connected to one side of said supply circuit and having its opposite end terminals connected to the other side of said direct current supply circuit through said electric discharge means; means for rendering said electric discharge means alternately conductive; a capacitance connected between said electric discharge means to commutate current from one electric discharge means to the other, current flowing through one portion of each primary winding when one of said electric discharge means is conductive and through another portion of each primary winding when the other of said electric discharge means is conductive; means for variably energizing said saturating winding with direct current; and means responsive to the voltage of said load circuit and operatively associated with said last mentioned means for varying the energization of said saturating winding in accordance with the voltage of said load circuit.

9. An electric translating apparatus for transmitting energy from a direct current supply circuit to an alternating current load circuit comprising, a saturable transformer having a magnetic core structure, a pair of primary windings, a pair of secondary windings, said magnetic core structure magnetically linking one of said primary windings to one of said secondary windings and magnetically linking the other of said primary windings to the other of said secondary windings, and a saturating winding for varying the magnetic linkage between said primary and secondary windings, said secondary windings being connected to said load circuit; a pair of electric discharge means, each of said primary windings having its electrical midpoint connected to one side of said supply circuit and having its opposite end terminals connected to the other side of said direct current supply circuit through said electric discharge means; means for rendering said electric discharge means alternately conductive; a capacitance connected between said electric discharge means to commutate current from one electric discharge means to the other, current flowing through one portion of each primary winding when one of said electric discharge means is conductive and through another portion of each primary winding when the other of said electric discharge means is conductive; a control electric discharge means, said control electric discharge means and said saturating winding being connected across a source of direct current; and means responsive to the voltage of said load circuit operatively associated with said control electric discharge means for varying its conductivity to vary the current in said saturating winding in accordance with the voltage of said load circuit.

10. An electric translating apparatus for transmitting energy from a direct current supply circuit to an alternating current load circuit comprising, a saturable transformer having a magnetic core structure, a pair of primary windings, a pair of secondary windings, said magnetic core structure magnetically linking one of said primary windings to one of said secondary windings and magnetically linking the other of said primary windings to the other of said secondary windings, and a saturating winding for varying the magnetic linkage between said primary and secondary windings, said secondary windings being connected to said load circuit; a pair of electric discharge means, each of said primary windings having its electrical midpoint connected to one side of said supply circuit and having its opposite end terminals connected to the other side of said direct current supply circuit through said electric discharge means for rendering said electric discharge means alternately conductive; a capacitance connected between said electric discharge means to commutate current from one electric discharge means to the other, current flowing through one portion of each primary winding when one of said electric discharge means is conductive and through another portion of each primary winding when the other of said electric discharge means is conductive; a control electric discharge device connected in series with said saturating winding across a direct current source, said control electric discharge means having a control member; and voltage sensing means operatively associated with said load circuit for impressing a potential on said control member which varies in accordance with the voltage of said load circuit.

References Cited in the file of this patent

UNITED STATES PATENTS

| Number | Name | Date |
|---|---|---|
| 413,353 | Tesla | Oct. 22, 1889 |
| 2,461,133 | Walsh | Feb. 8, 1949 |
| 2,554,778 | Erickson | May 29, 1951 |
| 2,603,768 | Trindle | July 15, 1952 |